United States Patent [19]
Hinze

[11] Patent Number: 5,884,816
[45] Date of Patent: Mar. 23, 1999

[54] LIQUID MEASURING DEVICE AND METHOD OF USING SAME

[76] Inventor: John F. Hinze, 313 Lowrey Dr., Woodbine, Iowa 51579

[21] Appl. No.: 905,127

[22] Filed: Aug. 1, 1997

[51] Int. Cl.⁶ .................................................. B67D 5/38
[52] U.S. Cl. .......................... 222/158; 222/207; 222/211
[58] Field of Search .................................... 222/207, 211, 222/158, 205

[56] References Cited

U.S. PATENT DOCUMENTS

| | | |
|---|---|---|
| 4,077,547 | 3/1978 | Donoghue . |
| 4,105,142 | 8/1978 | Morris, Jr. . |
| 4,106,673 | 8/1978 | Donoghue . |
| 4,298,038 | 11/1981 | Jennings . |
| 4,418,843 | 12/1983 | Jackman . |
| 4,899,789 | 2/1990 | Carow . |
| 5,224,632 | 7/1993 | Murakami et al. . |
| 5,259,536 | 11/1993 | Reyman . |
| 5,330,081 | 7/1994 | Davenport ................................. 222/211 |
| 5,570,820 | 11/1996 | Amoraal ................................... 222/205 |

*Primary Examiner*—Philippe Derakshani
*Attorney, Agent, or Firm*—Zarley, McKee, Thomte, Voorhees & Sease

[57] ABSTRACT

A liquid measuring device comprises a cap which is adapted to fit on a liquid container. A reservoir adapted to hold a dose of liquid is mounted on the cap. The reservoir has a opening in the top which is covered by a removable reservoir cap. A tube runs from the inside of the liquid container through the cap and upward into the reservoir. The liquid is forced from the container, through the tube and into the reservoir by squeezing the sides of the container inwardly. Similarly, liquid can be forced back into the container by turning the device upside down and squeezing inward on the sides of the reservoir. The liquid measuring device is adapted to fit any size pharmaceutical bottle or other liquid containers and may be reused.

15 Claims, 2 Drawing Sheets

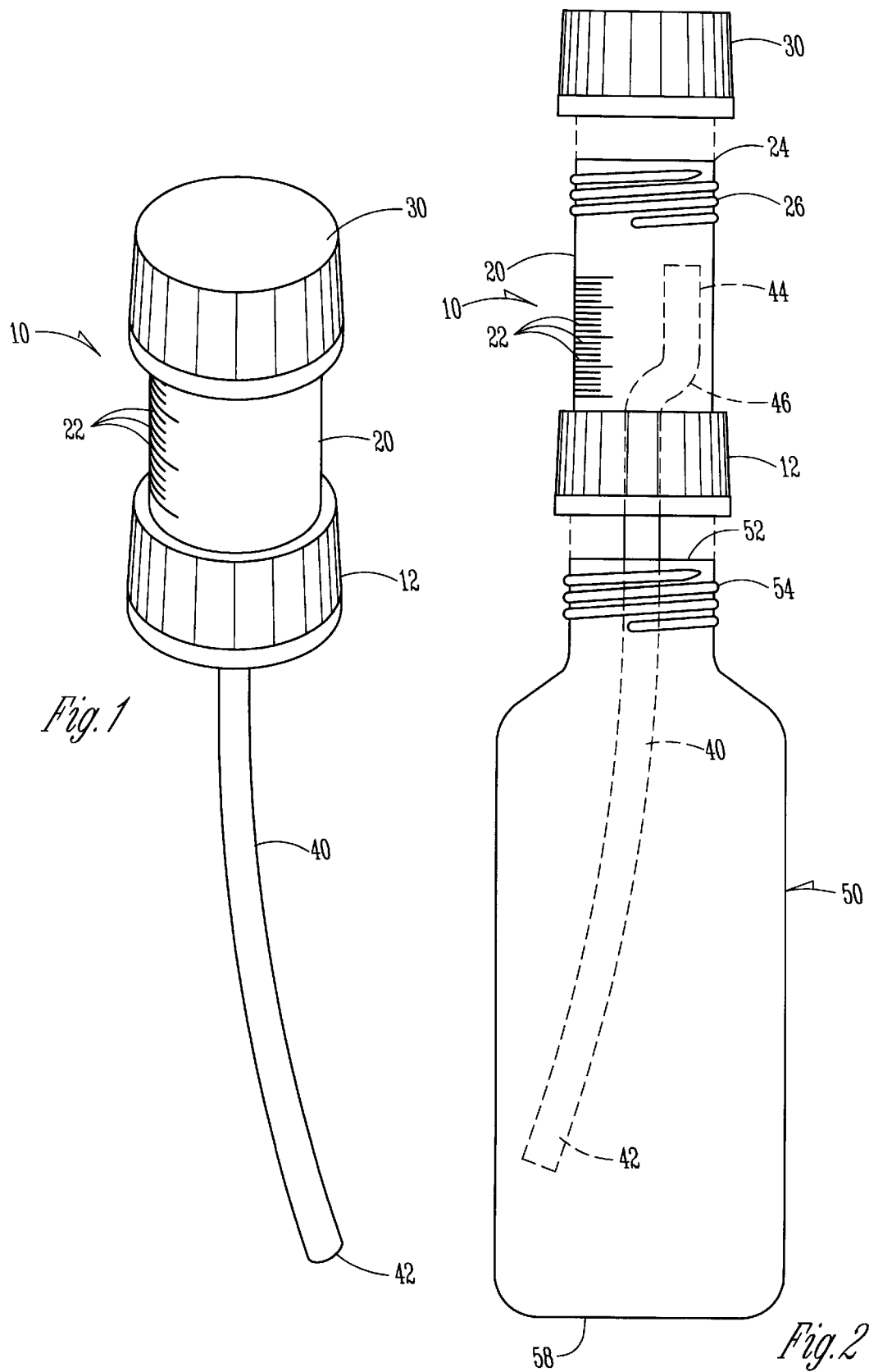

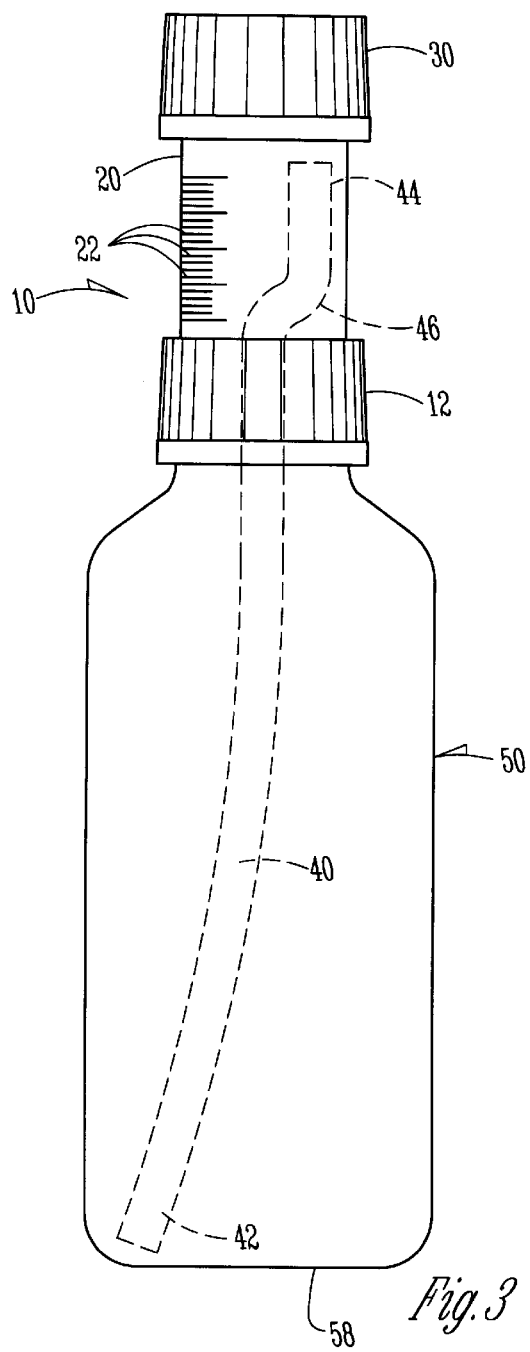
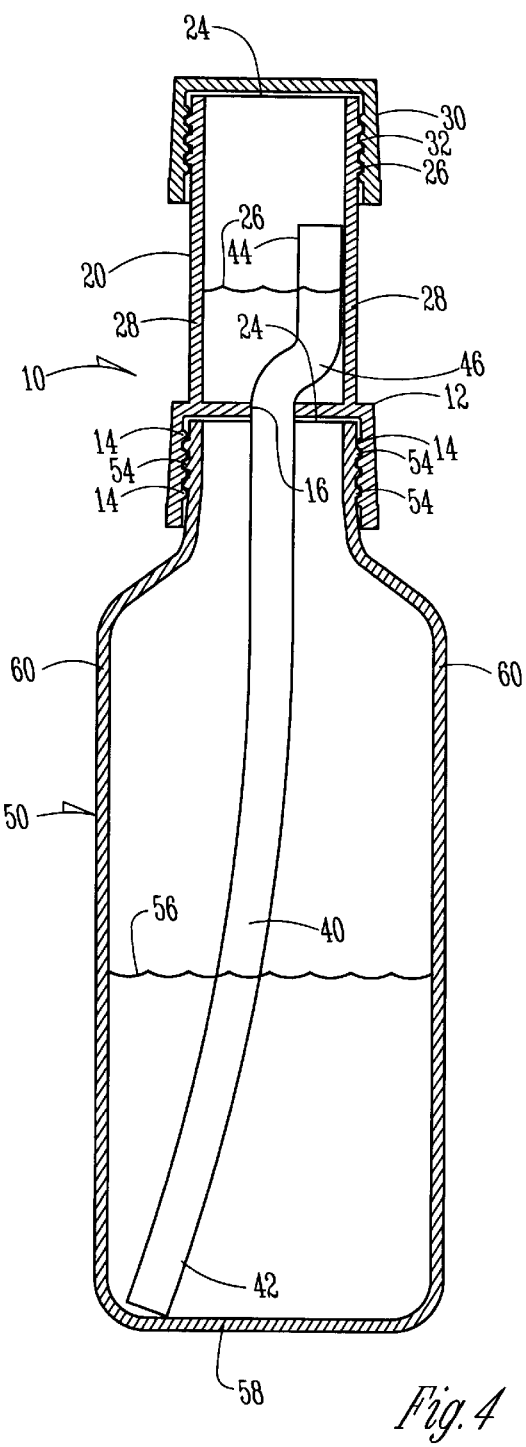

LIQUID MEASURING DEVICE AND METHOD OF USING SAME

FIELD OF THE INVENTION

The present invention relates to a device and method for dispensing predetermined amounts of liquid and, in particular, liquid medications.

BACKGROUND OF THE INVENTION

Bottles and other types of containers have long been used for dispensing various types of liquids, including beverages, medications, liquid soap, detergents, and fuel. In many instances, the user will want to dispense only a certain amount of the liquid from these containers. This is especially true with liquid medications where the user only needs to dispense a predetermined dose of the liquid.

There are certain goals involved in dispensing a predetermined amount of liquid from a container. First, the user will want to avoid dispensing any more liquid than is necessary so as to avoid wasting it, especially where the liquid is expensive, as is often the case with medications.

Second, the user will want to avoid spilling the liquid on themselves or other objects. This is especially the case where the liquid is staining. Further, it is often extremely important that the user obtain an accurate amount of liquid, such as with medications. For instance, with babies and small children it is extremely important that the child not receive more than his/her designated dosage of liquid medication since even slightly too much of the medication can often be harmful or toxic.

Attempts to achieve the above-mentioned goals have varied throughout the years. One method of dispensing medication has been to simply pour the liquid medication into a teaspoon. This method, however, often results in inaccurate dosing since, due to the differences in design and capacity, teaspoons can hold anywhere from 4 to 7.5 ml of liquid. This margin of error is compounded as the number of teaspoonfuls per dose increases. With babies and small children especially, this error in dosing can result in harmful side effects and even toxicity. Further, unless the user has a particularly steady hand, much of the liquid being poured onto the spoon gets spilled or wasted.

Another method of measuring liquid is to pour the liquid into a separate measuring device. This method of measuring is usually more accurate than the teaspoon method. However, using a separate measuring device often requires the user to go through the process of pouring liquid from its container into the device, pouring back excess liquid into the container, then repeating these steps until the correct dose is finally obtained. Further, especially when measuring small quantities of liquid, the measuring device is quite small and it is still easy to spill liquid while pouring it into the device and while pouring excess liquid back into the container.

Many containers have been designed which include a device for the dispensing of controlled-volume increments of liquid. Generally, in operation, the user squeezes the container, causing the liquid to move upwardly into a smaller container. Once the desired amount of liquid is in the smaller container, the user stops squeezing the primary larger container. The liquid is prevented from returning to the main container due to pressure or physical impediments. These devices, however, suffer from a number of disadvantages.

For example, many of the proposed devices which operate by pressurizing the primary larger container are prone to inaccuracy and erratic operation brought about by pressure differences within the container. These pressure differences tend to impede the flow of fluid out of the dispenser, resulting in inaccurate dosages.

Other similar devices generally allow for pressure equalization by allowing air to enter the container simultaneously with the withdrawal of liquid medication therefrom. This method, however, requires a complex mechanical construction of the container to allow for this simultaneous exchange of air and liquid. These complex devices are generally not economical to manufacture.

Further, if the user squeezes too much liquid into the smaller container or reservoir of these devices, the devices do not allow for the return of liquid back into the main container once it enters the reservoir. Thus, the user must dump out the excess liquid, which is then wasted.

In addition, containers having a built-in liquid measuring device are expensive to manufacture and require the user to throw away the entire device after the liquid in the container has been used.

Therefore, a primary objective of the present invention is the provision of an improved method and device for measuring predetermined amounts of liquids.

Another objective of the present invention is the provision of a method and device for measuring predetermined amounts of liquids which provides accurate dosing.

Another objective of the present invention is the provision of a method and means for measuring predetermined amounts of liquids wherein less liquid is wasted due to a decrease in the amount of spillage.

Yet a further objective of the present invention is the provision of a method and device for measuring predetermined amounts of liquids wherein less liquid is wasted by return of liquid in excess of the dosage to the main container.

Still a further objective of the present invention is the provision of a method and device for measuring predetermined amounts of liquids which may be applied to a variety of styles and sizes of liquid containers.

A further objective of the present invention is the provision of a method and device for measuring predetermined amounts of liquids which is economical to manufacture and convenient to use.

These and other objectives will be apparent from the following description of the invention.

SUMMARY OF THE INVENTION

The liquid measuring device of the present invention includes a cap for threadably mounting on the neck of a bottle or container. The cap has a reservoir for dispensing liquid from the reservoir. A tube extends between the container and the reservoir for transferring liquid therebetween. For using the device of the present invention, the liquid is squeezed from the container upward through the tube, and into the reservoir. The measured liquid is dispensed from the top of the reservoir through an opening which is kept covered with the reservoir cap to prevent spillage of the measured liquid until it is ready to use. The reservoir may optionally include markings on the outside to allow the user to measure various quantities of liquid. The device may be designed to fit standard size pharmaceutical bottles or any other type of liquid container.

When the bottle is squeezed, the tube allows the liquid to flow from the container up into the reservoir. The tube is bent or crimped in the reservoir to prevent the liquid from flowing back down into the container. However, if the user squeezes the walls of the reservoir, excess liquid can be forced back into the container to prevent waste. Once the desired dose of liquid is measured in the reservoir, the user removes the reservoir cap to consume or otherwise use the liquid.

The liquid measuring device is simple in design and can be economically manufactured. Further, it can be placed on different sizes of liquid containers and is reusable.

DESCRIPTION OF THE DRAWINGS

FIG. 1 a perspective view of the liquid measuring and dispensing device of the present invention.

FIG. 2 is an exploded side elevation view of the liquid measuring device and a conventional pharmaceutical bottle.

FIG. 3 is a side elevation view of the liquid measuring device as mounted on a conventional pharmaceutical bottle FIG. 4 is a sectional view of the liquid measuring device on the bottle.

DETAILED DESCRIPTION OF THE PREFERRED EMBODIMENT

The liquid measuring device of the present invention is generally designated in the drawings by the reference numeral 10. The liquid measuring device 10 includes a cap 12 mounted on the neck 52 of a bottle or container 50. Cap 12 is designed to fit on the neck 52 of conventional pharmaceutical bottles of any size, and may also be manufactured to fit other types of liquid containers, such as beverage containers, detergent bottles, etc. Preferably, cap 12 has threads 14 to fit threads 54 on the neck 52 of the container 50. Cap 12 has an opening 16 of a size sufficient to allow a tube 40 to extend there through.

Cap 12 has a reservoir 20 formed thereon. Reservoir 20 has a volume sufficient to hold at least one dose of liquid 56 from container 50. Reservoir 20 preferably has markings 22 on the outside to indicate the volume of liquid 56 contained therein. Reservoir 20 has opening 24 at the top to allow the user of the liquid measuring device 10 to consume or dispense the measured liquid 56 inside. Reservoir 20 has a removable cap 30 covering opening 24 to prevent liquid 56 within reservoir 20 from spilling prior to dispensing. Reservoir cap 30 may also have threads 32 for securing to threads 26 on reservoir 20. Reservoir cap 30 can also be secured to reservoir 20 through conventional attachment means which are well known in the art, the only requirement being that the reservoir cap 30 be removable so the user can readily obtain liquid 56 from reservoir 20.

Reservoir 20 includes flexible walls 28 which can be squeezed inwardly by the user. Reservoir 20 is preferably made of plastic but may also be made manufactured from other flexible materials. The tube 40 extends between container 50 and reservoir 20 for transferring liquid 56 therebetween. Tube 40 is used to draw liquid 56 from container 50 into reservoir 20. Tube 40 includes a lower end 42 lying within container 50, and an upper end 44 lying within reservoir 20. Upper end 44 includes a bend or crimp 46 to prevent liquid 56 from flowing back down to container 50 once it is in reservoir 20. If no inward pressure is exerted on reservoir walls 28, liquid 56 in the reservoir 20 normally will not flow back into container 50. By holding the liquid measuring device 10 upside down and squeezing inward on walls 28, excess liquid 56 in reservoir 20 can flow back into bottle or container 50. The placement of bend 46 is not critical so long as it is in the upper end 44 of tube 40, i.e. within reservoir 20.

The length of tube 40 is preferably almost the same as the combined lengths of reservoir 20 and container 50 such that as liquid 56 is emptied from container 50, tube 40 is still able to draw up liquid 56 from the bottom 58 of container 50. However, there should be at least a small amount of space present between the lower end 42 of tube 40 and the bottom 58 of container 50 so that liquid 56 is able to flow upwardly through tube 40. Tube 40 is preferably made of plastic so the user or manufacturer can cut off its length to fit the particular container 50.

The walls 60 of bottle or container 50 with which liquid measuring device 10 is used should be made of at least a partially flexible material so the user can squeeze the walls 60 inwardly. When the user squeezes inward on the container walls 60, liquid 56 is forced through tube 40 up into reservoir 20. If no inward pressure is exerted on container walls 60, the liquid 56 remains in container 50.

In practice, a user wishing to dispense a dose of liquid 26 in container 50, squeezes the walls 60 of container 50. This causes liquid 26 to move upward through tube 40, and into reservoir 20. The user continues to squeeze or pump the walls 60 of container 50 until the desired amount of liquid 26 is in reservoir 20. The user can monitor the volume of liquid 56 by watching markings 22 on the outside of reservoir 20.

If the user happens to squeeze too much liquid 56 into reservoir 20, the user can turn the liquid measuring device 10 upside down and squeeze the reservoir walls 28. This causes liquid 56 to flow back up into container 50. The user then continues to squeeze the reservoir walls 28 until the desired amount of liquid 56 is removed from the reservoir 20. When the desired dose of liquid 56 is present in reservoir 20, the user removes the reservoir cap 30 to dispense the liquid 56 from reservoir 20. The user may pour the liquid 56 into a separate container or drink directly from the reservoir 20. In this regard, reservoir 20 may further include a spout or other channeling device (not shown) to make the liquid 56 easier to pour or drink.

The liquid measuring device 10 and its components, including cap 12, reservoir 20, reservoir cap 30, and tube 40, can be manufactured from a variety of materials, with plastic being the preferred material since it is flexible, light, and inexpensive. Reservoir 20 should also be made with a clear material so the user can easily monitor the volume of liquid 56 contained therein. Reservoir 20 can be tinted amber or brown if the liquid 56 being used is light-sensitive.

Cap 12 is preferably round so it will fit conventional pharmaceutical bottles. Since the openings of the different sized pharmaceutical bottles (i.e. 4 oz, 6 oz, 8 oz, etc.) usually have the same circumference or neck size such that the cap 12 circumference will fit all sizes of bottles. Liquid measuring device 10 can also be reused and placed on other containers.

Liquid measuring device 10 can therefore be easily and economically utilized by pharmacists and other health professionals in their practices to increase patient compliance with their medications. Especially with liquid medications, patients will frequently not receive the correct dose of medication due to improper measurement. The liquid measuring device 10 can be applied to the patient's medication bottle to provide the patient with an accurate and convenient means of measuring out the correct dosage. Further, patients can purchase the liquid measuring device 10 separately from their medication to place on existing medication bottles and reuse them on subsequently purchased medications.

Further, liquid measuring device 10 can be used on other types of liquid containers, such as detergent bottles, or any other type of container from which the user desires a measured portion of liquid. The size and shape of cap 12 can be adjusted accordingly to fit the particular container. Further, the length and circumference of tube 40 can be adjusted accordingly to fit the size of the container. If tube 40 is made of plastic, it can simply be cut to fit the container.

In addition, the volume of reservoir 20 depends on the type and amount of liquid being dispensed. Similarly, reservoir markings 22 can vary according to the amount of liquid sought to be dispensed. For instance, if the liquid measuring device 10 is being used on a pharmaceutical bottle, markings 22 are preferably in 1 cc or ½ cc increments. In contrast, if the liquid measuring device 10 is being used to measure liquid ingredients for recipes, the markings 22 should be in teaspoons, tablespoons, ¼ cups, etc. Further, the reservoir 20 can be made of a markable material so that the user can place his/her markings 22 on reservoir 20, or various premarked adhesive labels can be applied to the reservoir 20.

The invention has been shown and described above in connection with the preferred embodiment, and it is understood that many modifications, substitutions, and additions may be made which are within the intended broad scope of the invention. From the foregoing, it can be seen that the present invention accomplishes at least all of the stated objectives.

What is claimed is:

1. A liquid measuring device comprising:
    a container cap, said container cap being adapted to be removably attached to a container;
    a reservoir mounted on the container cap, said reservoir having an opening for dispensing liquid, said reservoir having walls made of a flexible material so as to be squeezable to facilitate return of excess liquid into the container;
    a removable cap in covering relation to the opening of the reservoir; and
    a tube having upper and lower ends, the upper end being inside the reservoir and the lower end extending from the reservoir for insertion into the liquid container, the liquid being transferable through the tube between the container and the reservoir.

2. The liquid measuring device of claim 1 wherein the tube has a reduced diameter portion in the upper end to inhibit unintentional flow of liquid from the reservoir to the container.

3. The liquid measuring device of claim 1 wherein the container cap is threaded to attach to a threaded neck of the liquid container.

4. The liquid measuring device of claim 1 wherein the reservoir cap is threaded and the reservoir is threaded around the opening such that the cap is threadably attachable to the reservoir.

5. The liquid measuring device of claim 1 wherein the device is made of plastic.

6. The liquid measuring device of claim 1 wherein the container cap and reservoir are manufactured as a unitary piece.

7. The liquid measuring device of claim 1 wherein the reservoir has markings to indicate different volumes of liquid.

8. The liquid measuring device of claim 1 wherein the container cap is sized to fit conventional pharmaceutical bottles.

9. A liquid measuring device comprising:
    a container for holding a liquid;
    a container cap, removably attached to the container;
    a reservoir mounted on the container cap, said reservoir having an opening for dispensing liquid, said reservoir having walls made of a flexible material so as to be squeezable to facilitate return of excess liquid into the container;
    a removable cap in covering relation to the opening of the reservoir; and
    a tube having upper and lower ends for transferring liquid between the container and the reservoir, the upper end being inside the reservoir and the lower end extending into the container.

10. The liquid measuring device of claim 9 wherein the container is a medication container.

11. The liquid measuring device of claim 9 wherein the tube has a reduced diameter portion in the upper end to inhibit unintentional flow of liquid from the reservoir to the container.

12. The liquid measuring device of claim 9 wherein the reservoir has markings to indicate different volumes of liquid.

13. A method of measuring and dispensing predetermined amounts of liquid, the method comprising:
    squeezing a liquid-containing container such that liquid in the container moves upwardly through a tube into a reservoir on top of the container;
    continuing to squeeze the container until a desired amount of liquid is inside the reservoir;
    turning the container and reservoir upside down and squeezing the reservoir if there is an excess of liquid in the reservoir such that the liquid in the reservoir moves upwardly through the tube into the container;
    opening the reservoir; and
    dispensing the liquid from the reservoir.

14. The method of claim 13 further comprising the step of:
    drinking the liquid directly from the reservoir.

15. The method of claim 13 wherein the liquid is dispensed by removing a cap which closes an opening in the reservoir.

* * * * *